(Model.)
H. J. SPRATLING.
SEEDER AND PLANTER.
No. 262,142.     Patented Aug. 1, 1882.
2 Sheets—Sheet 1.
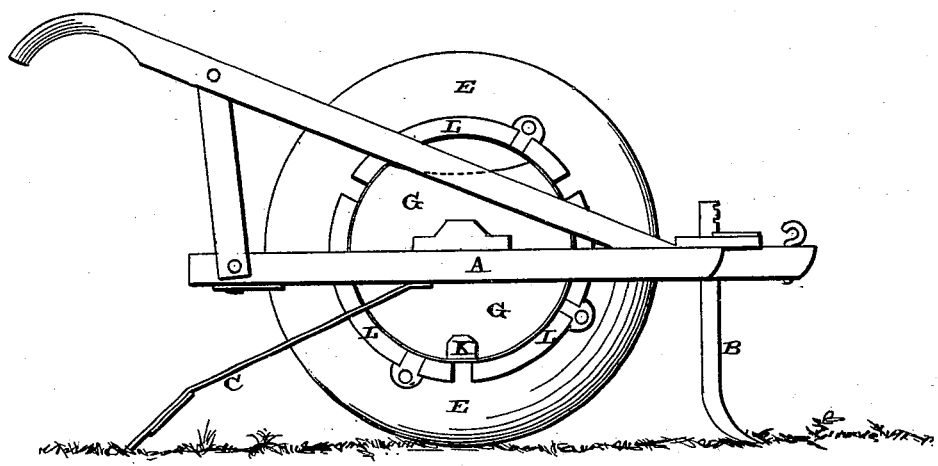
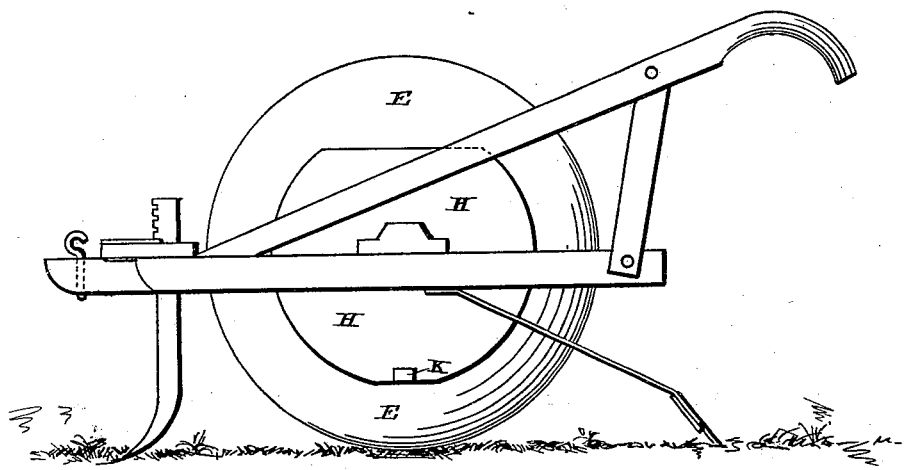

(Model.)

H. J. SPRATLING.
SEEDER AND PLANTER.

No. 262,142.   Patented Aug. 1, 1882.

2 Sheets—Sheet 2.

Witnesses:

Inventor:
H. J. Spratling
per
F. A. Lehmann
Atty.

United States Patent Office.

HENRY J. SPRATLING, OF GRANTVILLE, GEORGIA.

SEEDER AND PLANTER.

SPECIFICATION forming part of Letters Patent No. 262,142, dated August 1, 1882.

Application filed May 17, 1882. (Model.)

*To all whom it may concern:*

Be it known that I, H. J. SPRATLING, of Grantville, in the county of Coweta and State of Georgia, have invented certain new and useful Improvements in Seeders and Planters; and I do hereby declare the following to be a full, clear, and exact description of the invention, such as will enable others skilled in the art to which it pertains to make and use it, reference being had to the accompanying drawings, which form a part of this specification.

My invention relates to an improvement in seeders and planters; and it consists in a combination of a suitable frame, a supporting-wheel, and one or more seed-boxes, which are secured inside of the frame, so as to have their inner edges bear against the sides of the wheel, the wheel being provided with suitable stirring devices, and with a perforated flange which catches over the edge of the corn-box, as will be more fully described hereinafter.

Figure 2:
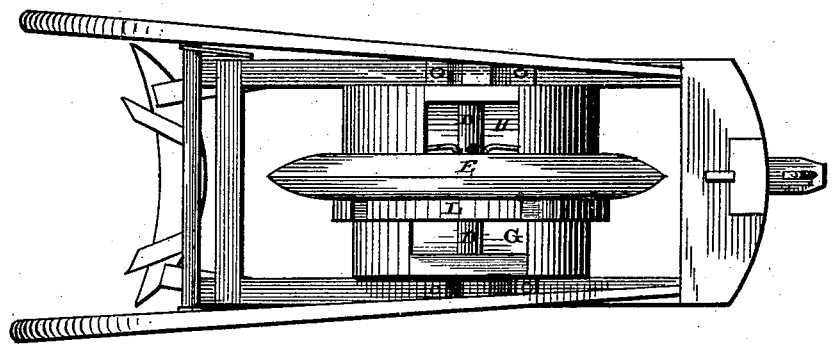
Figure 4:
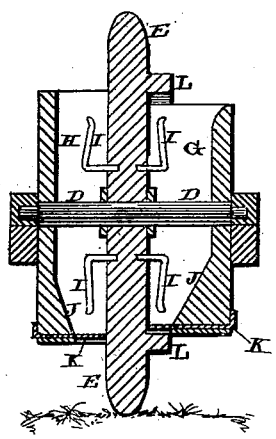

Figures 1 and 2 are side elevations of my invention, taken from opposite sides. Fig. 3 is a plan view of the same. Fig. 4 is a vertical cross-section.

A represents a suitable frame, which is provided with a furrow-opener, B, at its front end, and with a covering device, C, at its rear end, in the usual manner.

Passing horizontally across the top of the frame is the shaft D, and secured to the center of the shaft is the supporting-wheel E, which has its edge made sharp or rounding, so as to deepen or open the furrow still more that has been made by the furrow-opener B.

Secured inside of the frame, and supported upon the shaft, are the two seed-boxes G H, one of which is intended especially for corn and the other either for cotton-seed or any suitable form of fertilizer.

In order to prevent the corn, cotton-seed, or fertilizer from clogging together, the wheel is provided with suitable arms or stirring devices, I, of the form shown, which, circulating around through the boxes, serve not only to prevent clogging, but to move the substances toward the holes in the bottom of the box and force them out.

In order that the seed or fertilizing substances shall move toward the openings made through the box, an inclined plane or surface, J, may be placed in each box at the bottom, and thus act as a guide to cause the substances to move toward the holes from their own weight.

Each one of the holes through the two boxes is controlled by means of slides K, so that the holes may be closed entirely, and the amount passing through them regulated at will.

Secured to the side of the wheel upon which the corn-box G is placed is a suitable flange, L, which may either be made in a single piece and have openings made through it, or else the flange may be made in a number of pieces and have their ends separated sufficiently far to form openings, through which the grain will pass. This flange is made wide enough to catch over the inner edge of the corn-box far enough to cover the opening made through it for the discharge of the grain, and as each opening in the flange or between the ends of its different parts passes under this hole the grain is allowed to drop through into the ground. This flange is not needed upon the side in which the cotton-seed or fertilizer is to be placed, for there are no regular distances at which these substances are to be dropped.

A seeder of this construction is very simple, cheap, and reliable in operation, and has no parts which are likely to be broken or get out of repair.

Having thus described my invention, I claim—

In a planter, the combination of the solid wheel E, provided with the flange L, having openings through it for the seed to drop through, and having the stirring devices I, with the seed-boxes G H, and slides K, substantially as shown.

In testimony whereof I affix my signature in presence of two witnesses.

HENRY JOHNSON SPRATLING.

Witnesses:
E. M. YEAGER,
A. B. STROUD.